UNITED STATES PATENT OFFICE.

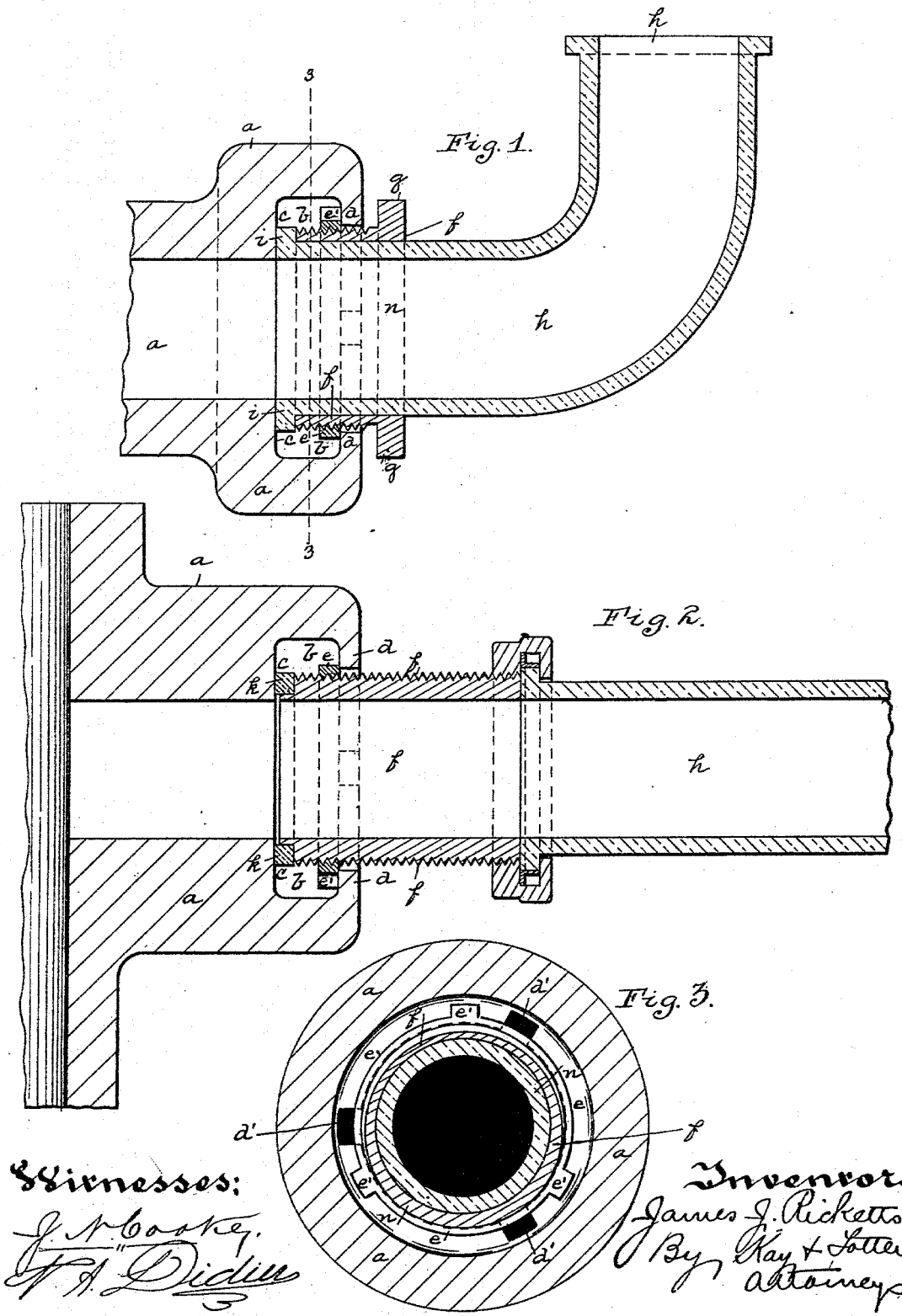

JAMES J. RICKETTS, OF PITTSBURG, PENNSYLVANIA.

COUPLING FOR WATER-CLOSETS.

SPECIFICATION forming part of Letters Patent No. 515,925, dated March 6, 1894.

Application filed April 21, 1892. Serial No. 430,078. (No model.)

*To all whom it may concern:*

Be it known that I, JAMES J. RICKETTS, a resident of Pittsburg, in the county of Allegheny and State of Pennsylvania, have invented a new and useful Improvement in Couplings for Water-Closets; and I do hereby declare the following to be a full, clear, and exact description thereof.

My invention relates to the couplings for water closets and like earthen bowls, by which the supply and discharge pipes are connected thereto. The usual custom has been to employ what is termed a "spud" for this purpose, the bowl having a horn provided with an annular recess having lips extending inwardly therefrom, and the spud having lugs passing between and turned behind the lips, the recess or chamber being then filled with sulphur to make a tight joint, and the regular connection being made to the spud. The principal objections to this connection were that the coupling was permanent, when made, and that a tight joint could not be insured, and the object of the present invention is to overcome these objections.

It consists, generally stated, in combining with the earthenware horn, an inwardly threaded ring within the mouth of said horn, said ring having lugs engaging by a bayonet joint with said horn, a washer fitting against a seat in the horn, and a threaded nipple engaging with the ring and compressing the washer against the seat of the horn.

To enable others skilled in the art to make and use my invention, I will describe it more fully, referring to the accompanying drawings in which—

Figures 1 and 2 are longitudinal sections showing two forms of the invention; and Fig. 3 is a cross section on the line 3—3, Fig. 1.

Like letters of reference indicate like parts in each figure.

The horn of the water closet or other earthenware bowl is shown at $a$, said horn forming the mouth to the bowl and having the annular recess or depression $b$ and the seat $c$ at the base thereof. The horn has also the inwardly projecting lips $d$ at the outer end of the recess to hold the ring $e$ within the recess, the lugs $e'$ on said ring passing through the spaces $d'$ between the lips, and the ring being then turned to bring said lugs back of the lips and retain the ring in the horn by what may be termed a bayonet joint, any equivalent construction being, of course, included within my invention. The ring $e$ is interiorly threaded, and the nipple $f$ screws within the ring as shown. I prefer to employ the invention with flexible tube connections, such as shown in patents previously granted to me, and in that case the nipple has the angular portion $g$ for engagement by a wrench and the nipple fits around the body $n$ of the rubber connection, and the annular flange $i$ thereof extends out so as to fit against the seat $c$ of the horn. Then by screwing the nipple $f$ through the ring $e$ the inner end of the nipple will be pressed against the flange $i$ which forms a washer to be compressed between the nipple $f$ and seat $c$, and so form a tight joint. Connection can then be made to the rubber tube or elbow $h$. When the rubber tube or elbow is not employed, a washer $k$ is placed against the seat $c$ as shown in Fig. 2, and the nipple $f$ is screwed against the washer to form the tight joint, and in that case the outer end of the nipple is exteriorly threaded so as to provide for the coupling thereto of the pipe or fitting to be connected to the closet. In either case a simple, cheap, and efficient coupling between the earthenware closet and bowl, and the supply or discharge pipe may be obtained, and one which while insuring a tight joint can be removed and replaced at will.

What I claim as my invention, and desire to secure by Letters Patent, is—

1. In combination with an earthenware bowl, or like article, having a mouth provided with a seat at the base, a washer fitting against the seat, a ring within said mouth engaging by a bayonet joint with the bowl, and a nipple engaging with the ring to compress the washer against the seat of the bowl, substantially as and for the purposes set forth.

2. In combination with an earthenware bowl, or like article, having the mouth provided with the seat $c$ at the base thereof and inwardly projecting lips $d$ at the entrance thereof, the interiorly threaded ring $e$ within said mouth, the lug $e'$ formed thereon, the washer pressing against the base of said mouth, and the nipple $f$ entering said mouth and adapted to compress said washer, substantially as and for the purposes set forth.

In testimony whereof I, the said JAMES J. RICKETTS, have hereunto set my hand.

JAMES J. RICKETTS.

Witnesses:
J. N. COOKE,
ROBT. D. TOTTEN.